United States Patent
Wagner

(10) Patent No.: US 10,540,562 B1
(45) Date of Patent: Jan. 21, 2020

(54) SYSTEM AND METHOD FOR DYNAMIC THRESHOLDING FOR MULTIPLE RESULT IMAGE CROSS CORRELATION

(71) Applicant: REVENUE MANAGEMENT SOLUTIONS, LLC, Oklahoma City, OK (US)

(72) Inventor: Jay Wagner, Yukon, OK (US)

(73) Assignee: Revenue Management Solutions, LLC, Oklahoma City, OK (US)

( * ) Notice: Subject to any disclaimer, the term of this patent is extended or adjusted under 35 U.S.C. 154(b) by 38 days.

(21) Appl. No.: 15/838,978

(22) Filed: Dec. 12, 2017

Related U.S. Application Data

(60) Provisional application No. 62/434,235, filed on Dec. 14, 2016.

(51) Int. Cl.
  *G06K 9/34* (2006.01)
  *G06K 9/32* (2006.01)
  *G06K 9/46* (2006.01)
  *G06F 16/58* (2019.01)

(52) U.S. Cl.
  CPC .......... *G06K 9/3233* (2013.01); *G06F 16/58* (2019.01); *G06K 9/4604* (2013.01)

(58) Field of Classification Search
  CPC .......... G06K 9/00456; G06K 9/00463; G06K 9/3233; G06K 9/4604; G06F 16/58
  See application file for complete search history.

(56) References Cited

U.S. PATENT DOCUMENTS

| | | | | |
|---|---|---|---|---|
| 7,702,185 B2* | 4/2010 | Keating | ........... | G06F 16/583 382/305 |
| 8,391,585 B2* | 3/2013 | Kuchii | ........... | G06T 5/20 382/141 |
| 2012/0218284 A1* | 8/2012 | Yager | ........... | G09G 5/003 345/589 |
| 2013/0136338 A1* | 5/2013 | Asente | ........... | G06K 9/46 382/154 |
| 2013/0208784 A1* | 8/2013 | Pietila | ........... | H04N 19/137 375/240.02 |
| 2014/0193099 A1* | 7/2014 | Yoshikawa | ........... | A61B 6/5235 382/295 |
| 2014/0270362 A1* | 9/2014 | Najafi Shoushtari | ........... | G06K 9/6204 382/103 |
| 2016/0189000 A1* | 6/2016 | Dube | ........... | G06K 9/00523 382/160 |

* cited by examiner

*Primary Examiner* — Bhavesh M Mehta
*Assistant Examiner* — Ian L Lemieux
(74) *Attorney, Agent, or Firm* — McAfee & Taft, A Professional Corporation

(57) ABSTRACT

The present disclosure relates to a computer-implemented system and method for finding matching occurrences of an item of interest (or image or sub-image) within a document (or larger image) via cross correlation and setting a dynamic threshold for each document (or larger image). The described system and method are capable of matching and locating the one or more items of interest within each specific document (or larger image).

19 Claims, 5 Drawing Sheets

*FIG. 2B*

PAGE 1 OF 3     457

PROVIDER REMITTANCE ADVICE

| CHECK/EFT DT 10/07/14 | REF # MSP UC1 0 |
|---|---|
| CHECK/EFT | PAYMENT |
| PAYEE TAX ID | PAYEE ID |

PAYEE

*QUESTIONS? CALL 1-555-555-5555*

Prod Dt: 10/06/2014

PROV NO.     403 NAME     UPIN NO. PLZ SUBMIT

| PATIENT | JANE DOE 1 | GRP-PATIENT ID | 85-00 | PAT CTRL # | 202 |

CLM # 168    CLAIM DT 08/08/14   08/08/14 DT REVD 09/18/14   ICD9 DIAG 30002
REND PROV    REND PROV ID    MED REC #

| LINE CTRL# | DOS | REV # | ADJ PROD SVE.MOD | SUB PROD SVC.MOD | CHG | ADJ AMT | INT CD | GRP CD | CLM ADJ RSN CD | REMARK CD | PAYMENT |
|---|---|---|---|---|---|---|---|---|---|---|---|
| 000001 | 08/08/14 | 1 | 510 | 90834 | 130.00 | 23.59 106.41 | 0065 0065 | PR OA | 3 023 | | .00 |

CLM CHG    130.00   130.00   CLM PAYMENT   .00
PAT RESP    23.59    REMARK

| PATIENT | JACK DOE 2 | GRP-PATIENT ID | 85-00 | PAT CTRL # | 264 |

CLM # 168    CLAIM DT 08/27/14   08/08/14 DT REVD 09/28/14   ICD9 DIAG 29631
REND PROV    REND PROV ID    MED REC #

| LINE CTRL# | DOS | REV # | ADJ PROD SVE.MOD | SUB PROD SVC.MOD | CHG | ADJ AMT | INT CD | GRP CD | CLM ADJ RSN CD | REMARK CD | PAYMENT |
|---|---|---|---|---|---|---|---|---|---|---|---|
| 000001 | 08/27/14 | 1 | 510 | 90837 | 130.00 | 23.59 106.41 | 0065 0065 | PR OA | 3 023 | | .00 |

CLM CHG    130.00   130.00   CLM PAYMENT   .00
PAT RESP    23.59    REMARK

| PATIENT | JILL DOE 3 | GRP-PATIENT ID | 85-00 | PAT CTRL # | 171 |

CLM #    CLAIM DT 08/07/14   08/07/14 DT REVD 09/19/14   ICD9 DIAG 29621
REND PROV    REND PROV ID    MED REC #

| LINE CTRL# | DOS | REV # | ADJ PROD SVE.MOD | SUB PROD SVC.MOD | CHG | ADJ AMT | INT CD | GRP CD | CLM ADJ RSN CD | REMARK CD | PAYMENT |
|---|---|---|---|---|---|---|---|---|---|---|---|
| 000001 | 08/07/14 | 1 | 510 | 90834 | 130.00 | 106.41 | 0065 | OA | 023 | | 23.00 |

PAGE 1 OF 6

PROVIDER REMITTANCE ADVICE

PAYEE

| CHECK/EFT DT | REF # MSP U88 |
|---|---|
| CHECK/EFT | PAYMENT |
| PAYEE TAX ID | PAYEE ID |

*QUESTIONS? CALL 1-555-555-5555*

202

Prod Dt: 11/16/2016

PROV NO.        NAME                                                                UPIN NO. PLZ SUBMIT

| PATIENT ABE DOE 4 | GRP PATIENT ID | 48-00 | PAT CTRL # | 582 |

CLM #    631         CLAIM DT   10/24/16   10/24/16   DT REVD 11/02/16
DIAG  F4325
REND PROV                                  REND PROV ID       99        MED REC #

| LINE CTRL# DOS | REV # | ADJPROD SVE.MOD | SUB PROD SVC.MOD | CHG | ADJ AMT | INT CD | GRP CD | CLM ADJ RSN CD | REMARK CD | PAYMENT |

000001
  10/24/15         1   510    90832              202            116.00    64.52          CO   045             61.00

CLM CHG                                                         116.00    64.52          CLM PAYMENT          61.00
PAT RESP                            .00                         REMARK

| PATIENT ALICE DOE 5 | GRP PATIENT ID | 85-00 | PAT CTRL # | 506 |

CLM #    632         CLAIM DT   10/19/16   10/19/16   DT REVD 09/26/14
DIAG  F3341
REND PROV                                  REND PROV ID       99        MED REC #

| LINE CTRL# DOS | REV # | ADJPROD SVE.MOD | SUB PROD SVC.MOD | CHG | ADJ AMT | INT CD | GRP CD | CLM ADJ RSN CD | REMARK CD | PAYMENT |

000001
  10/19/16         1   510    90837              202            263.00   123.61          CO   045            139.39

CLM CHG                                                         263.00   123.61          CLM PAYMENT         139.39
PAT RESP                            .00                         REMARK

| PATIENT ALEX DOE 6 | GRP PATIENT ID | 85-00 | PAT CTRL # | 742 |

CLM #    762         CLAIM DT   10/04/16   10/04/16   DT REVD 11/03/16   ICD9 DIAG   29621
DIAG  F3177  F1290  Z720  G43909  10
REND PROV                                  REND PROV ID       99        MED REC #

| LINE CTRL# DOS | REV # | ADJPROD SVE.MOD | SUB PROD SVC.MOD | CHG | ADJ AMT | INT CD | GRP CD | CLM ADJ RSN CD | REMARK CD | PAYMENT |

SYSTEM AND METHOD FOR DYNAMIC THRESHOLDING FOR MULTIPLE RESULT IMAGE CROSS CORRELATION

CROSS-REFERENCE TO RELATED APPLICATIONS

This application claims priority from U.S. Provisional Patent Application Ser. No. 62/434,235, entitled DYNAMIC THRESHOLDING FOR MULTIPLE RESULT IMAGE CROSS CORRELATION, filed Dec. 14, 2016, the entire contents of which are incorporated herein by reference.

BACKGROUND

When searching and locating for multiple occurrences of an item of interest (or sub-image) within a document (or larger image), specifically when applying cross correlation, setting a threshold too high or too low generally returns results that are not meaningful. For example, if a threshold is set too high, too few meaningful results are located; and similarly, if a threshold is set too low, too many results, including false results, are located such that the desired results are obfuscated and difficult to locate or determine.

SUMMARY

The present disclosure relates to a computer-implemented systems, methods, and techniques for finding one or more matching occurrences of an item of interest (or image or sub-image) within a document (or larger image) via cross correlation and setting a dynamic threshold for each document as opposed to having a static predefined threshold. The described systems, methods, and techniques are capable of matching and locating the one or more item(s) of interest within each document with greater accuracy to have more meaningful results per document and thereby find the proverbial needle(s) in the haystack.

For example, a computer-implemented system and method for locating one or more preselected items of interest in an image and selecting a dynamic threshold value for each image is disclosed. A method comprising the steps of: (a) searching a bitonal image for a preselected item of interest. The method also includes step (b), after step (a), locating outliers of said bitonal image by performing a median absolute deviation analysis on an assigned value for every location of said bitonal image. The method also comprising the step of (c), selecting a threshold value based on a maximum value derived from said median absolute deviation analysis to locate said one or more outliers; and step (d), for locations greater than the selected threshold value defined in step (c), identifying a precise location for each of said one or more preselected items of interest.

A method of locating one or more preselected items of interest in an image is disclosed. The method being performed by one or more processors and comprising the steps of: (a) searching the image for the preselected item of interest. Wherein the searching step includes scanning each location of the image for the preselected item of interest and assigning a value for each scanned location. Wherein the assigned value is representative of a similarity between each scanned location of the image and the preselected item of interest. The method includes (b), after step (a), locating one or more sets of one or more outliers of said image by performing a median absolute deviation analysis on each assigned value for each scanned location of said image. The method includes (c), after step (b), selecting a dynamic threshold value based on a maximum value derived from said median absolute deviation analysis performed in step (b) of the located one or more outliers. The method includes (d), after step (c), for locations greater than the selected dynamic threshold value from step (c), identifying a location in the image for each of said one or more preselected items of interest.

A computer-implemented method performed by one or more processors comprising the steps of: (a) searching an image for a preselected sub-image; (b) after step (a), locating one or more sets of outliers of said image by performing a median absolute deviation analysis on an assigned value for every location of said image. The method including step (c), selecting a threshold value based on a maximum value derived from said median absolute deviation analysis to locate said one or more outliers; and step (d), for locations greater than the selected threshold value defined in step (c), identifying one or more locations of said preselected sub-image within said image.

A non-transitory computer-readable storage media having stored thereon a plurality of computer-executable instructions for locating one or more preselected items of interest within an image and selecting a dynamic threshold value for each image which, when executed by a processor, cause the processor to: search the image for one or more occurrences of the preselected item of interest. Wherein the search step includes scanning each location of the image for the preselected item of interest and assigning a value for each scanned location, and wherein the assigned value is representative of a similarity between each scanned location of the image and the preselected item of interest. The non-transitory computer-readable storage media having stored thereon a plurality of computer-executable instructions for locating one or more preselected items of interest within an image and selecting a dynamic threshold value for each image which, when executed by a processor, also cause the processor to: locate one or more sets of one or more outliers of said image by performing a median absolute deviation analysis on each assigned value for each scanned location of said image; select a dynamic threshold value based on a maximum value derived from said median absolute deviation analysis to locate said one or more outliers; and for locations greater than the selected dynamic threshold value, identify a location in said image for each of said one or more preselected items of interest.

A system comprising a processor and a computer-readable storage media operably connected to said processor is disclosed. The computer-readable storage media includes instructions that when executed by said processor, cause performance said processor to perform a method of locating one or more preselected items of interest in an image and selecting a dynamic threshold value for each image. The method including the steps of: searching the image for the preselected item of interest, wherein the searching step includes scanning each location of the image for the preselected item of interest and assigning a value for each scanned location, wherein the assigned value is representative of a similarity between each scanned location of the image and the preselected item of interest. The method also including locating one or more sets of one or more outliers of said image by performing a median absolute deviation analysis on each assigned value for each scanned location of said image. The method including selecting a dynamic threshold value based on a maximum value derived from said median absolute deviation analysis to locate said one or more outliers; and for locations greater than the selected dynamic threshold value, identifying a location in the image for each of said one or more preselected items of interest.

BRIEF DESCRIPTION OF THE DRAWINGS

FIG. 2B is a sample document (or larger image) containing the image of the example item of interest for the template search.

FIG. 2C is another sample document containing the image of the item of interest for the template search.

DETAILED DESCRIPTION

The computer-implemented systems, methods, and techniques described herein relates to finding one or more recurrences of the same item of interest (or image or sub-image) 202 within a document (or larger image) 200. The disclosed systems, methods, and techniques are indifferent as to the constituent parts of the item of interest 202. For example, if the item of interest 202 is specific text or a design, the disclosed systems, methods, and techniques are indifferent. Rather the systems, methods, and techniques described herein search for and locate the item of interest 202 within the larger image 200 that matches a given template representative of the preselected item of interest 202. The presently described systems, methods, and techniques are versatile, in that the template provided can be varied depending on the application and that a specified threshold for locating the item of interest 202 within a document 200 is not set. The described systems, methods, and techniques are capable of finding one or more occurrence of the item of interest 202 for a given document 200 and setting a threshold for that specific document. The threshold for locating the item of interest 202 in multiple documents is dynamically adjusted for each document, in part because the quality of the document, quality of the contents of the document, and/or the contents within each document may vary between document to document.

For ease of discussion and not by way of limitation of the presently disclosed systems, methods, and techniques, this disclosure will be in reference to an application of searching and locating multiple occurrences of an item of interest 202 in a medical explanation of benefits (EOB). For example, in the context of processing EOB documents, the industry generally manually reviews each EOB page for each item of interest and manually keys the applicable entry. For example, in an EOB, an item of interest may be to know where a claim begins. As the format of EOBs may vary from company to company, content or specific text may be the same throughout the industry. As will be described herein by way of example, the disclosed systems, methods, and techniques identify the one or more positions of the preselected item of interest 202 within a document 200. For purposes of this example and discussion, The EOB document 200 is in a bitonal format.

Figures 1, 2A:
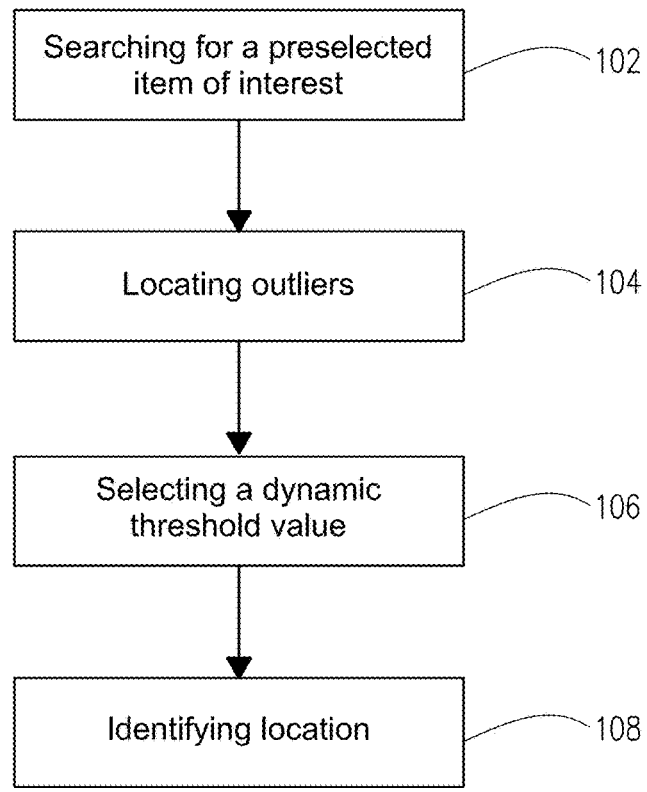
FIG. 1 is an example flow chart for an example method for dynamic thresholding for multiple result image cross correlation.
FIG. 2A is an example image template of an example item of interest.

FIG. 2A is an example image template of an example preselected item of interest or sub-image 202, i.e. "GRP-PATIENT ID". FIG. 2B is a sample document or larger image 200 that happens to contain three occurrences of the preselected item of interest 202 for the template search of document 200. The image or document 200 may be in bitonal format. With reference to FIG. 1, the systems, methods, and techniques described herein locate one or more preselected items of interest 202 in an image 200 includes step 102 of searching the image 200 for the preselected item of interest 202.

The searching step 102 includes cross-correlating each location of the image 200 with the preselected item of interest 202. The searching step 102 includes scanning each location of the image 200 and assigning a value for each scanned location, wherein the assigned value is representative of a similarity between each scanned location of the image 200 and a template representative of the preselected item of interest 202. For example, the searching step 102 uses a cosine similarity comparison algorithm to assign a similarity or distance value for each location of the image 200. Other comparison algorithms and techniques may be used for the given format of the image 200, e.g. grayscale, color, bitonal. Such comparison algorithms are known in the art and will not be detailed herein. For purposes of the example depicted in the figures, the assigned similarity value for each location is plotted on FIG. 3A with the label "location confidence" and marked with reference numeral 302. As used herein, the distance value that is used in the context of computer science as an accuracy measurement as how near or far away the scanned location within the document 200 is from the target or template representative of the item of interest 202 and not a measurement of length.

Figure 3A:
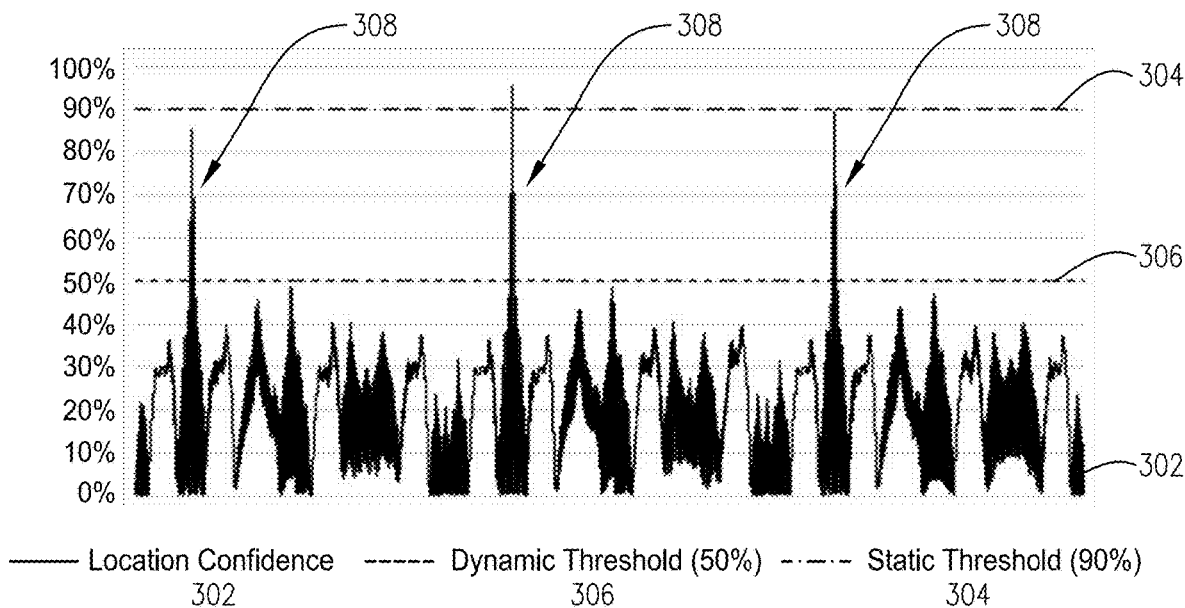
FIG. 3A is a response graph of the item of interest image template of FIG. 2A correlation over the sample document page of FIG. 2B.

For example, and as will be further discussed, with reference to FIG. 3A, the line 304 depicted with a long followed by a short dash is a static threshold line that is predefined and set to the value of 0.9 and the dashed line 306 is the dynamic threshold that is determined and selected via the present disclosure for each given image or document 200. FIG. 3A is illustrative of having a static threshold set too high resulting in missing actual occurrences of items of interest 202. For example, if the static threshold is set too low, for example, at 0.4, this will result in getting too many results, meaning that the actual items of interest 202 along with extraneous results will need to be sorted through. As will be further discussed, the presently described systems, methods, and techniques are capable of selecting a dynamic threshold for each given image or document 200, thereby focusing attention to and identifying the meaningful results representative of the items of interests. By way of analogy of the proverbial needle in the haystack, the one or more item of interest or sub-image 202 are the needles, and each haystack is document or image 200.

With reference to FIG. 1 at block 104, after the searching step 102, one or more outliers of said image 200 are located by performing a median absolute deviation (MAD) analysis on each assigned value for each scanned location of said image 200. For purposes of this disclosure and example in connection with the EOB document, outliers on the high side lend itself to likely being a match to the preselected item of interest 202. With reference to the plot labeled "location confidence" 302 in FIG. 3A, there happen to be three sets of "spikes" labeled with reference numeral 308 that rise above the rest of the plot. These three sets of "spikes" 308 are representative of the outliers that resulted from step 104.

With reference to FIG. 1 at block 106, a dynamic threshold value (labeled with reference numeral 306) is determined and selected for each given image 200. The dynamic threshold value is determined and selected based on a maximum value derived from said median absolute deviation (MAD) analysis of the located outliers found in block 104. MAD is a statistical method used for identifying outliers by determining an upper and lower bound based off of the median value of a data set. With MAD, the upper bound is used as the dynamic threshold as any value above it would be considered an outlier and not part of the "median" data set. Stated differently, the MAD analysis is used as a tool to define and select the dynamic threshold 306 for each image 200. The resultant value of the MAD analysis is a constant number. With reference to FIG. 3A, the selected dynamic threshold 306 for the given image 200 depicted in FIG. 2B is about 0.5005 and represented by the dashed line 306 in FIG. 3A.

Figure 3B:
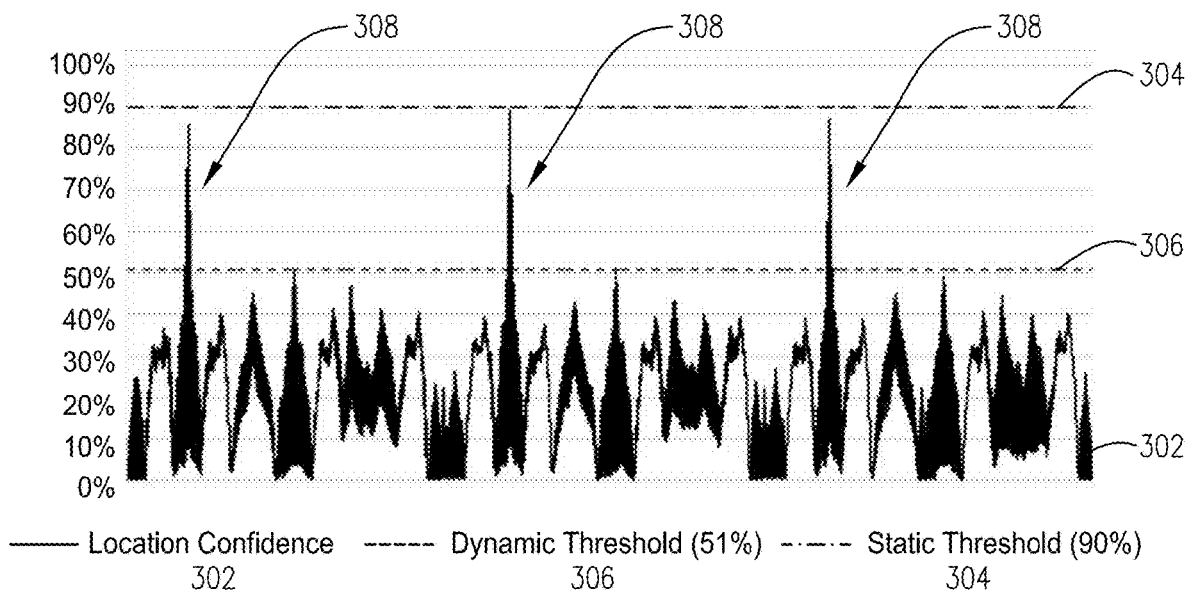
FIG. 3B is a response graph of the item of interest image template of FIG. 2A correlation over the sample document page of FIG. 2C.

For example, FIGS. 3A and 3B are the visual representation of the described systems, methods, and techniques carried out on the images 200 of FIGS. 2B and 2C, respectively, where FIG. 2A serves as the template of the item of interest or sub-image 202 to be located within each image 200 of FIGS. 2B and 2C. As can been seen in comparing FIGS. 3A and 3B, the dynamic threshold 306 for each image 200 is different due to one or more differences between the images 200 depicted in FIGS. 2B and 2C, e.g. quality of image, quality of contents, difference in content, etc.

With reference to FIG. 1, after the dynamic threshold value for the image 200 is selected as represented by block 106, identifying a location for each of said one or more preselected items of interest 202 is done for the locations greater than the selected dynamic threshold value 306 for that given image 200, and represented by block 108 in FIG. 1. With reference to FIG. 3A, this includes focusing on locations having an assigned value greater than the selected dynamic threshold of 0.5005.

Figure 4:
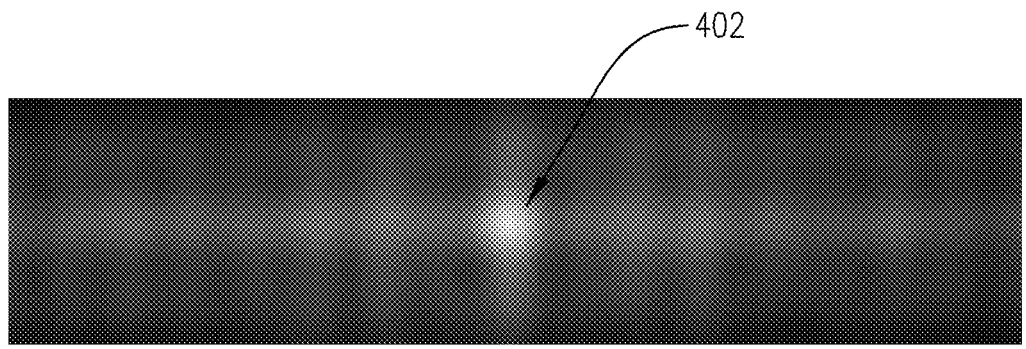
FIG. 4 is a heat-map representation of the similarity of FIG. 2A to the first (topmost) occurrence within the image of FIG. 2B and the first peak (left-most) in FIG. 3A.

Identifying a location for each of said one or more preselected items of interest 202 includes determining a maximum value for each of the set of "spikes" 308 depicted in FIG. 3A. As each of these set of "spikes" 308 is made up of numerous location points on the image 200 that overlap with each other, the presently described systems, methods, and techniques identify each of the one or more precise location(s) of the item of interest 202 within that image 200. For example, with reference to FIG. 3A and the first spike set, i.e. left-most spike, 308, location point 7547 is the precise location for the item of interest/sub-image 202—representative of the first (or top-most) occurrence of GRP-PATIENT ID depicted in FIG. 2B, having a value of 0.8532. This also corresponds to the white dot 402 in the center of FIG. 4. FIG. 4 is a heat-map representation of the similarity of FIG. 2A to the first peak (left-most spike set) 308 represented in FIG. 2B. As the template search of document 200 moves away from the point (i.e. item of interest's 202 precise location), the similarity, as expressed in how white or "bright" for very similar to black or "dark" for not similar at all, begins to diminish. As merely a point of preference, the locations for this example and depiction are measured from the upper-left corner of the template representative of the item of interest 202, e.g. FIG. 2A in this case. The matching locations are taken as the local maxima from overlapping areas as measured from the upper-left corner of the template left-to-right and top-to-bottom. The reference points for the matching locations are not limited to reference points and orientations described herein, rather, other reference or orientation may be used and are suitable provided that the described results of the present disclosure are achieved.

The described methods and techniques can be repeated for one or more new images or other documents, where the selected dynamic threshold for each image/document 200 may be different and/or the same compared to the threshold determined and selected for prior images 200, thereby achieving a dynamic threshold that is suitable and appropriate for each given image 200 as opposed to a predefined and static threshold value to be applied to all images 200.

As described herein, the systems, computer-implemented methods, and techniques use cross-correlation of an image (or preselected item(s) of interest or sub-image 202) to find and locate one or more results within a document (or larger image) 200 and set a dynamic threshold for each document (or larger image) 200. The present disclosure is capable of identifying the one or more precise locations of the item(s) of interest 202 within a document or (larger image) 200 such that, if desired, further processing, such as OCRing (optical character recognition), and/or further actions can be carried out at the identified location of the document (or larger image) 200. For example, OCRing only the located item(s) of interest within the document (or larger image) as opposed to OCRing the entire document limits the costs of computing resources, e.g. time, power, memory, etc., while simultaneously enabling more efficient, meaningful, and accurate processing on a per document basis and in the aggregate of processing documents. Additionally, dynamically adjusting the threshold for each document as opposed to having a set threshold provides an increase in more accurate processing for each document and documents in the aggregate. Other benefits made possible by the present disclosure include the ability to accurately label information within an unstructured document in order to correctly use the information therein, and/or finding information within the document relative to the image.

Figure 5:
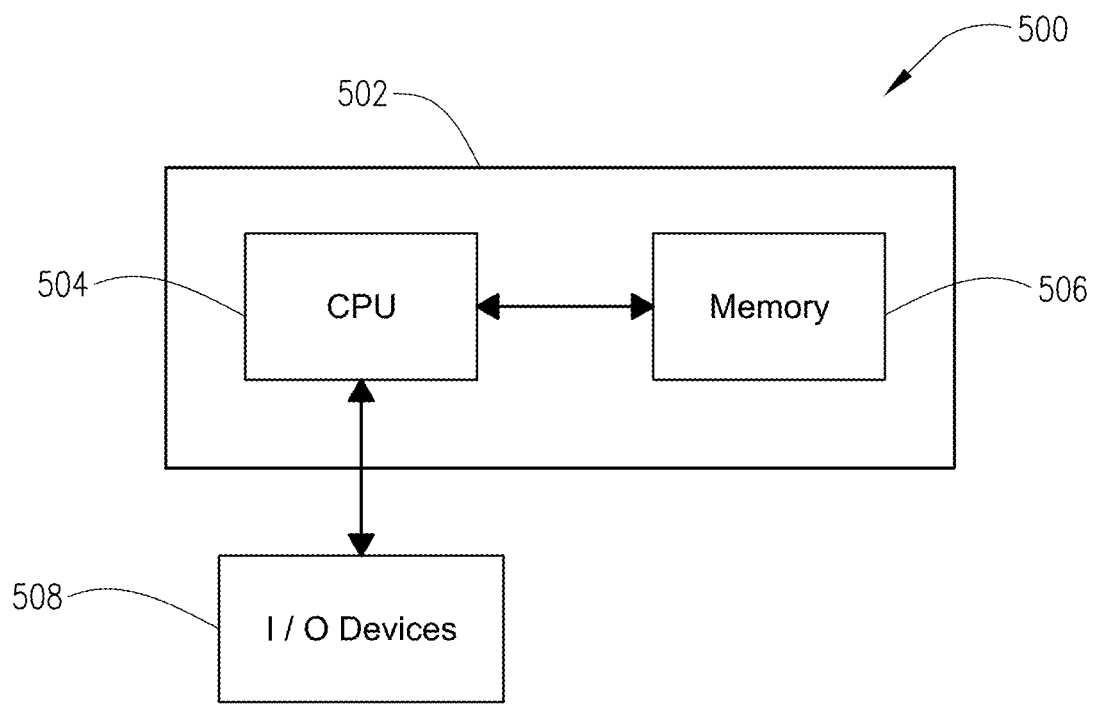
FIG. 5 is a simplified block diagram that shows an example of a computing system to utilize one or more embodiments of the present disclosure.

FIG. 5 is a simplified block diagram for a computing system 500 suitable for implementing and performing the methods and techniques described herein. Computing system 500 includes a computing device 502 operably connected to one or more input/output (I/O) devices 508. Computing device 502 is representative of various forms of computing devices, including desktops, laptops, workstations, servers, mobile devices, such as personal digital assistants, tablets, smart-phones, cellular telephones, and other similar computing devices.

Computing device 502 includes a central processing unit (CPU) 504. CPU 504 includes one or more processors reading and/or executing instructions, programs, and applications stored in memory 506 and/or computer readable storage media of I/O devices 508, and accessing and/or storing data in memory 506 and/or computer readable storage media of I/O devices 508. CPU is operably connected with memory 506. CPU 504 is also operably connected with I/O devices 508 through an applicable interface component for the corresponding I/O device 508, e.g. port (serial, parallel USB), wire, card (sound, video, network), and the like. Exemplary types of CPU 504 may include general purpose processors, digital programmable devices, microcontrollers, digital signal processors (DSPs), application specific integrated circuit(ASIC), and field programmable gate array (FPGA), or other components and combinations thereof designed to perform the functions described herein.

Memory 506 includes data storage, volatile memory, e.g. random access memory (RAM), and non-volatile memory, e.g. read only memory (ROM).

I/O devices 508 include various devices that a user may use to interact with the computing device 502. Representative I/O devices 508 include keyboards, touchscreens, mouse and other pointing devices; a visual display device, such as a cathode ray tube, liquid crystal display, screens, and other suitable display devices for visually communicating and interacting with the user; audio devices, such as a microphone, headphones, speakers; and print devices for printing, scanning, faxing, and/or receiving and/or transmitting data and images. I/O devices 508 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 508 may also include a communication device for connecting computing system 500 with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof.

System 500 may include one or more I/O devices 508 of the same type or of different types and combinations thereof and one or more computing devices 502 of the same type or of different types and combinations thereof may be operably connected to each other and cooperating together to carry out the methods, functions, and techniques described herein.

The functions, methods, or algorithms described herein may be implemented in hardware, software, firmware, or any combinations thereof. When implemented in software, the described methods, functions, and techniques may be stored in memory, computer-readable storage media, and/or combinations thereof and transmitted as one or more instructions or code to cause CPU 504 to operate in accordance with the methods, functions, techniques, and teachings of the present disclosure. The operable connection of the various components of computing system 500 described in reference to FIG. 5 may include buses, circuitry, wires, wireless, or other similar connections. The functions, methods, and techniques described herein may be implemented by one or more computing system 500 in cooperation with each other. The components of system 500 shown and described, including their relationships and functions, are exemplary and are not to limit the implementation of the systems, methods, and techniques described herein.

The disclosed systems, methods, and techniques are not limited to the example application described herein. Such examples are for readability and ease of understanding and are not intended nor should be limited to the disclosed application or any numerical values provided in connection with such examples. For example, the disclosed systems, techniques, and methods of dynamically adjusting a threshold for each document (or larger image) while locating one or more occurrences of an item of interest (or image or sub-image within the larger image) via cross correlation in each document can be used in other applications, such as identifying anomalies in medical images or scans in order to alert a medical professional to focus on certain areas of the scan for diagnostic purposes or other applications to which location of any outliers may be of interest.

Although certain steps are described herein and illustrated in the figures as occurring sequentially, some steps may occur simultaneously with each other or in an order that is not depicted. The present disclosure of the disclosed systems, methods, techniques, and functions are not to be limited to the precise descriptions and illustrations. Other embodiments will be apparent to one skilled in the art. As such, the foregoing description merely enables and describes the general uses of the described systems, methods, and techniques. While certain embodiments of the systems, methods, and techniques have been described for the purpose of this disclosure, those skilled in the art can make changes without departing from the spirit and scope thereof. Thus, the appended claims define what is claimed.

What is claimed is:

1. A method of locating one or more preselected items of interest in an image, the method being performed by one or more processors and comprising the steps of:
    (a) searching the image for the preselected item of interest; wherein the searching step includes scanning one or more locations of the image for the preselected item of interest and assigning a value for each scanned location, wherein the assigned value is representative of a similarity between each scanned location of the image and the preselected item of interest;
    (b) after step (a), locating one or more sets of one or more outliers of said image by performing a median absolute deviation analysis on each assigned value for each scanned location of said image;
    (c) after step (b), selecting a dynamic threshold value based on a maximum value derived from said median absolute deviation analysis performed in step (b) of the located one or more outliers; and
    (d) after step (c), for locations greater than the selected dynamic threshold value from step (c), identifying a location in the image for each of said one or more preselected items of interest.

2. The method of claim 1, wherein identifying a location in the image for each of said one or more preselected items of interest includes identifying a maximum value for each located set of one or more outliers, wherein said maximum value for each located set of one or more outliers is representative of the location for each of said one or more preselected items of interest within said image.

3. The method of claim 1, wherein steps (a)-(d) are performed simultaneously on one or more images.

4. The method of claim 1, further comprising the step of repeating steps (a)-(d) on one or more new images.

5. The method of claim 4, wherein said dynamic threshold value selected in step (c) for said image and each of said one or more new images is different.

6. The method of claim 4, wherein said dynamic threshold value selected in step (c) for said image and each of said one or more new images are the same.

7. The method of claim 1, wherein the image is a bitonal image.

8. A computer-implemented method performed by one or more processors comprising the steps of:
    (a) searching an image for a preselected sub-image;
    (b) after step (a), locating one or more sets of outliers of said image by performing a median absolute deviation analysis on an assigned value for each location of a plurality of locations of said image;
    (c) selecting a threshold value based on a maximum value derived from said median absolute deviation analysis; and
    (d) for locations greater than the selected threshold value defined in step (c), identifying one or more locations of said preselected sub-image within said image.

9. The method of claim 8, wherein steps (a)-(d) are performed simultaneously on one or more images.

10. The method of claim 8, further comprising the step of repeating steps (a)-(d) on a new image.

11. The method of claim 9, wherein said threshold value selected in step (c) of said image and a new image is different.

12. The method of claim 9, wherein said threshold value selected in step (c) of said image and a new image is the same.

13. The method of claim 8, wherein the step of searching an image for a preselected sub-image includes the step of cross-correlating each location of said plurality of locations of said image with said sub-image; wherein the step of cross-correlating includes scanning each location of said plurality of locations of said image for said sub-image and assigning a value for each scanned location, said assigned value representative of a similarity of each of said scanned location of said image with said sub-image.

14. The method of claim 8, wherein identifying one or more locations of said preselected sub-image within said image step includes identifying a maximum value for each located set of outliers, wherein said maximum value for each located set of outliers is representative of each one or more locations of said preselected sub-image within said image.

15. The method of claim 8, wherein said image is a bitonal image.

16. A non-transitory computer-readable storage media having stored thereon a plurality of computer-executable instructions for locating one or more preselected items of interest within an image and selecting a dynamic threshold value for each image which, when executed by a processor, cause the processor to:
    search the image for one or more occurrences of the preselected item of interest, wherein searching the image for one or more occurrences of the preselected item of interest includes scanning one or more locations of the image for the preselected item of interest and assigning a value for each scanned location, wherein the assigned value is representative of a similarity between each scanned location of the image and the preselected item of interest;
    locate one or more sets of one or more outliers of said image by performing a median absolute deviation analysis on each assigned value for each scanned location of said image;
    select a dynamic threshold value based on a maximum value derived from said median absolute deviation analysis to locate said one or more outliers; and
    for locations greater than the selected dynamic threshold value, identify a location in said image for each of said one or more preselected items of interest.

17. The non-transitory computer-readable storage media of claim 16, wherein identifying a location in said image for each of said one or more preselected items of interest includes identifying a maximum value for each located set of one or more outliers, wherein said maximum value for each located set of one or more outliers is representative of the location for each of said one or more preselected items of interest within said image.

18. A system comprising:
    a processor; and
    a computer-readable storage media operably connected to said processor, said computer-readable storage media including instructions that when executed by said processor, cause performance said processor to perform a method of locating one or more preselected items of interest in an image and selecting a dynamic threshold value for each image, the method comprising:
        searching the image for the preselected item of interest, wherein the searching step includes scanning one or more locations of the image for the preselected item of interest and assigning a value for each scanned location, wherein the assigned value is representative of a similarity between each scanned location of the image and the preselected item of interest;
        locating one or more sets of one or more outliers of said image by performing a median absolute deviation analysis on each assigned value for each scanned location of said image;
        selecting a dynamic threshold value based on a maximum value derived from said median absolute deviation analysis to locate said one or more outliers; and
        for locations greater than the selected dynamic threshold value, identifying a location in the image for each of said one or more preselected items of interest.

19. The system of claim 18, wherein the step of identifying a location in the image for each of said one or more preselected items of interest includes identifying a maximum value for each located set of one or more outliers, wherein said maximum value for each located set of one or more outliers is representative of the location for each of said one or more preselected items of interest within said image.

* * * * *